United States Patent
Matsubara et al.

(10) Patent No.: US 10,632,681 B2
(45) Date of Patent: Apr. 28, 2020

(54) DATA PROCESSING APPARATUS, THREE-DIMENSIONAL MANUFACTURING SYSTEM, AND NON-TRANSITORY COMPUTER READABLE MEDIUM

(71) Applicant: FUJI XEROX CO., LTD., Tokyo (JP)

(72) Inventors: Koichi Matsubara, Kanagawa (JP); Kenji Hara, Kanagawa (JP); Ryosuke Yonesaka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 339 days.

(21) Appl. No.: 15/646,395

(22) Filed: Jul. 11, 2017

(65) Prior Publication Data
US 2018/0104899 A1 Apr. 19, 2018

(30) Foreign Application Priority Data
Oct. 19, 2016 (JP) .................. 2016-205273

(51) Int. Cl.
*B29C 64/393* (2017.01)
*G05B 19/4099* (2006.01)
(Continued)

(52) U.S. Cl.
CPC .......... *B29C 64/393* (2017.08); *B29C 64/106* (2017.08); *B29C 64/112* (2017.08); *B29C 64/386* (2017.08); *B29C 64/40* (2017.08); *B29K 2995/0021* (2013.01); *B29K 2995/0029* (2013.01); *B33Y 10/00* (2014.12); *B33Y 30/00* (2014.12); *B33Y 50/00* (2014.12); *B33Y 50/02* (2014.12); *G05B 19/0426* (2013.01);
(Continued)

(58) Field of Classification Search
CPC ... B29C 64/112; B29C 64/393; B29C 64/386; B29C 64/106; B29C 64/40; G05B 19/0426; G05B 19/408; G05B 19/4086; G05B 19/4093; G05B 19/4097; G05B 19/4099; G05B 2219/49023; G05B 2219/49019; G05B 2219/49008; G06T 19/20; G06T 2219/2012; B33Y 10/00; B33Y 30/00; B33Y 50/00; B33Y 50/02; B29K 2995/0021; B29K 2995/0029
USPC .................. 425/162, 375; 264/308
See application file for complete search history.

(56) References Cited

U.S. PATENT DOCUMENTS

2016/0151979 A1* 6/2016 Urban .................. B33Y 50/00 264/308
2016/0346996 A1 12/2016 Hakkaku et al.

FOREIGN PATENT DOCUMENTS

| JP | 2013-075390 A | 4/2013 |
|----|---------------|--------|
| JP | 2015-044299 A | 3/2015 |
| JP | 2015-147327 A | 8/2015 |

* cited by examiner

*Primary Examiner* — Joseph S Del Sole
*Assistant Examiner* — Lawrence D. Hohenbrink, Jr.
(74) *Attorney, Agent, or Firm* — Oliff PLC

(57) ABSTRACT

A data processing apparatus includes:
a receiving unit: that receives first data defining a shape and a color of a three-dimensional object; and
a generating unit, wherein when two or snore color components interfere with each other in one voxel as a result of performing a halftoning process for each of plural color components based on color information in the first data, the generating unit generates color voxel data by assigning any one of the two or more color components as color information of the one voxel and assigning the remaining color components of the two or more color components as color information of voxels present around the one voxel.

11 Claims, 10 Drawing Sheets

(51) Int. Cl.
    *B33Y 10/00* (2015.01)
    *B29C 64/40* (2017.01)
    *G05B 19/4093* (2006.01)
    *B33Y 50/00* (2015.01)
    *B29C 64/106* (2017.01)
    *G05B 19/408* (2006.01)
    *B29C 64/386* (2017.01)
    *B29C 64/112* (2017.01)
    *G06T 19/20* (2011.01)
    *G05B 19/4097* (2006.01)
    *B33Y 30/00* (2015.01)
    *B33Y 50/02* (2015.01)
    *G05B 19/042* (2006.01)

(52) U.S. Cl.
    CPC ........ *G05B 19/408* (2013.01); *G05B 19/4086* (2013.01); *G05B 19/4093* (2013.01); *G05B 19/4097* (2013.01); *G05B 19/4099* (2013.01); *G05B 2219/45187* (2013.01); *G05B 2219/49008* (2013.01); *G05B 2219/49019* (2013.01); *G05B 2219/49023* (2013.01); *G06T 19/20* (2013.01); *G06T 2219/2012* (2013.01)

YELLOW
DEPTH
DIRECTION

MAGENTA

DATA PROCESSING APPARATUS, THREE-DIMENSIONAL MANUFACTURING SYSTEM, AND NON-TRANSITORY COMPUTER READABLE MEDIUM

CROSS-REFERENCE TO RELATED APPLICATIONS

This application is based on and claims priority under 35 use 119 from Japanese Patent Application No. 2016-205273 filed on Oct. 19, 2016.

BACKGROUND (i) Technical Field

The present invention relates to a data processing apparatus, a three-dimensional manufacturing system, and a non-transitory computer readable medium.

(ii) Related Art

In the related art, a three-dimensional manufacturing apparatus called a 3D printer has been proposed. As a three-dimensional manufacturing process using the 3D printer, there has been generally known a technique of receiving data that defines a shape and a color of an object (for example, polygon data) as input data, converting the received data into voxel data that is compatible with a three-dimensional manufacturing process of a manufacturing apparatus, and manufacturing the object based on the converted voxel data. Also, when the manufacturing apparatus is capable of outputting multiple coloring materials, a three-dimensional color object may be manufactured based on voxel data to which color information is assigned for each voxel.

SUMMARY

According to an aspect of the invention, a data processing apparatus includes:

a receiving unit that receives first data defining a shape and a color of a three-dimensional object; and a generating unit, wherein when two or more color components interfere with each other in one voxel as a result of performing a halftoning process for each of plural color components based on color information in the first data, the generating unit generates color voxel data by assigning any one of the two or more color components as color information of the one voxel and assigning the remaining color components of the two or more color components as color information of voxels present around the one voxel.

BRIEF DESCRIPTION OF THE DRAWINGS

Exemplary embodiments of the present invention will be described in detail based on the following figures wherein.

DETAILED DESCRIPTION

Hereinafter, exemplary embodiments of the present invention will be described with reference to the accompanying drawings. The definitions of terms used in the present specification are as follows.

"Voxel": the smallest unit of a small cube used to express a three-dimensional object. A voxel corresponds to a pixel in a two-dimensional image. A three-dimensional object may be visualized by combining these voxels. Thus, when a three-dimensional object is generally manufactured by a manufacturing apparatus, the manufacturing is performed based on data describing an object to be manufactured as an aggregate of voxels. Further, similarly to two-dimensional pixels, if color information is added to each voxel, colors may be given in units of voxels.

"Voxel data": data describing an object to be manufactured as an aggregate of voxels.

"Color Voxel Data": voxel data in which color information is added to each voxel.

"Halftoning process": a process of determining whether or not to assign color information to each voxel by error diffusion, dither, or the like.

"Interference": multiple color components are assigned to one voxel.

Figure 1:
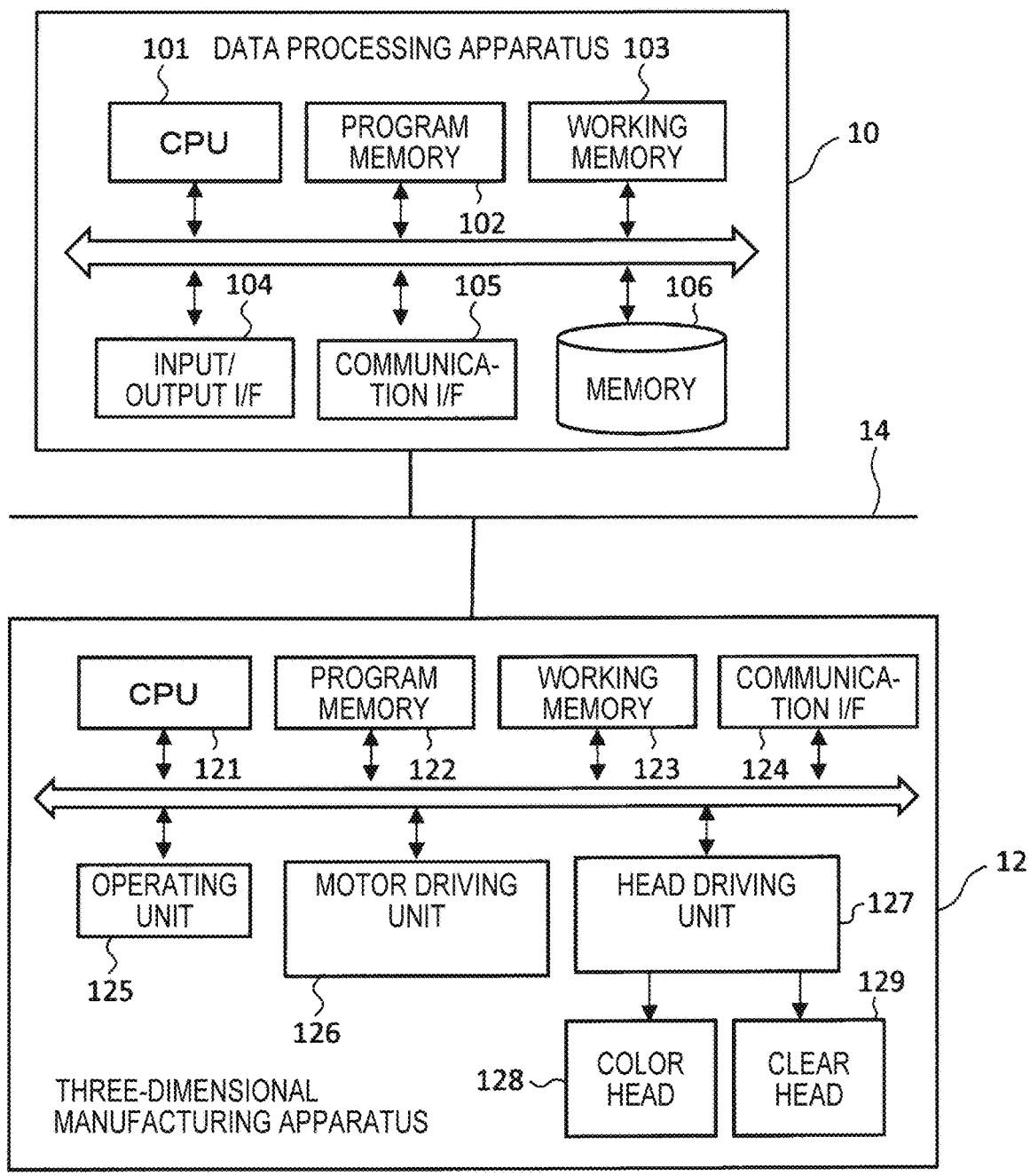
FIG. 1 is a system configuration diagram.

FIG. 1 is a configuration diagram of a three-dimensional manufacturing system according to an exemplary embodiment. The three-dimensional manufacturing system includes a data processing apparatus 10 and a three-dimensional manufacturing apparatus 12. The data processing apparatus 10 and the three-dimensional manufacturing apparatus 12 are connected to each other by a communication network 14.

The data processing apparatus 10 receives three-dimensional object data (3D data), performs a predetermined processing thereon, and outputs the processed data to the three-dimensional manufacturing apparatus 12 via the communication network 14. The data processing apparatus 10 includes a receiving unit and a generating unit. Specifically, the data processing apparatus 10 includes a CPU 101, a program memory 102 such as a ROM, an SSD, or an HDD, a working memory 103 such as a RAM, an input/output interface (I/F) 104 that performs input/output with a keyboard, a mouse, an optical disc such as a CD-ROM, a semiconductor memory such as a USB memory or an SD card, and a display, a communication interface (I/F) 105 that communicates with an external device including the three-dimensional manufacturing apparatus 12, and a memory 106 such as an HDD. The input/output I/F 104 and the communication I/F 105 correspond to the receiving unit. The CPU 101 corresponds to the generating unit. The data processing apparatus 10 may be con figured with a computer, a tablet terminal, or the like.

The CPU 101 reads and executes a processing program stored in the program memory 102 to process the three-dimensional object data, and outputs the processed data to the three-dimensional manufacturing apparatus 12 via the communication I/F 105 and the communication network 14. The main processes executed by the CPU 101 are as follows:

A process of converting polygons constituting the three-dimensional object data (3D data) into voxels A process of determining, for each voxel, whether to set each voxel as a color voxel or an achromatic voxel A process of converting color data of each voxel into a data format that can be processed by the three-dimensional manufacturing apparatus 12

In the process of determining whether to set each voxel as a color voxel or an achromatic voxel includes a process of calculating a distance to a polygon closest to a processing target voxel. The process of determining color data for a color voxel uses the color density of the closest polygon. The process may use the distance to the closest polygon as necessary. The process of converting color data into the data format that can be processed by the three-dimensional manufacturing apparatus 12 includes a process of converting the color data of a color voxel into CMYK, a halftoning process, and a slice process.

The three-dimensional manufacturing apparatus 12 functions as a so-called 3D printer. The three-dimensional manufacturing apparatus 12 includes a CPU 121, a program memory 122 such as a ROM, a working memory 123, a communication interface (I/F) 124, an operating unit 125, a motor driving unit 126, a head, driving unit 127, a color head 128, and a clear head 129.

In accordance with a processing program stored in the program memory 122, the CPU 121 outputs control signals to the motor driving unit 126 and the head driving unit 127 using the three-dimensional object data from the data processing apparatus 10 input via the communication I/F 124, based on an operation instruction from the operating unit 125, so as to drive various motors and heads.

The motor driving unit 126 drives various motors including a motor for moving a support base (stage) that supports the object being manufactured and a head moving motor.

The head driving unit 127 controls ejection of ink (manufacturing liquid) of each of the color head 128 and the clear head 129. The color head 128 is configured with a cyan (C) head, a magenta (M) head, a yellow (Y) head, and a black (K) head. In addition, the clear head ejects transparent ink (manufacturing liquid) that is not colored. The head driving unit 127 controls ejection by, for example, driving piezoelectric elements provided in ejection channels of the respective heads but the driving method is not limited thereto. In addition, the clear head 129 may not eject transparent ink, but may eject white ink. "White" or "transparent" is defined as an achromatic color in contrast to cyan, magenta, yellow and black colors.

The three-dimensional manufacturing apparatus 12 ejects the inks of the color head 128 and the clear head 129 using the slice data of the three-dimensional object output from the data processing apparatus 10 and sequentially stacks the slices in the height direction to form a desired three-dimensional object. Specifically, the three-dimensional object is formed by ejecting ink (manufacturing liquid) while sequentially moving the color head 128 and the clear head 129 in three axial directions of XYZ. The color head 128 and the clear head 129 may be fixed, and the stage provided under the color head 128 and the clear head 129 may be sequentially moved in the three axial directions of XYZ.

The color head 128 may be configured with the cyan (C) head, the magenta (M) head, and the yellow (Y) head. Alternatively, the color head 128 may be configured with other different color heads in addition to the cyan (C) head, the magenta (M) head, the yellow (Y) head, and the black (K) head.

As the communication network 14, the Internet, a local area network (LAN), Wi-Fi®, Bluetooth®, or the like is used.

Figure 2:
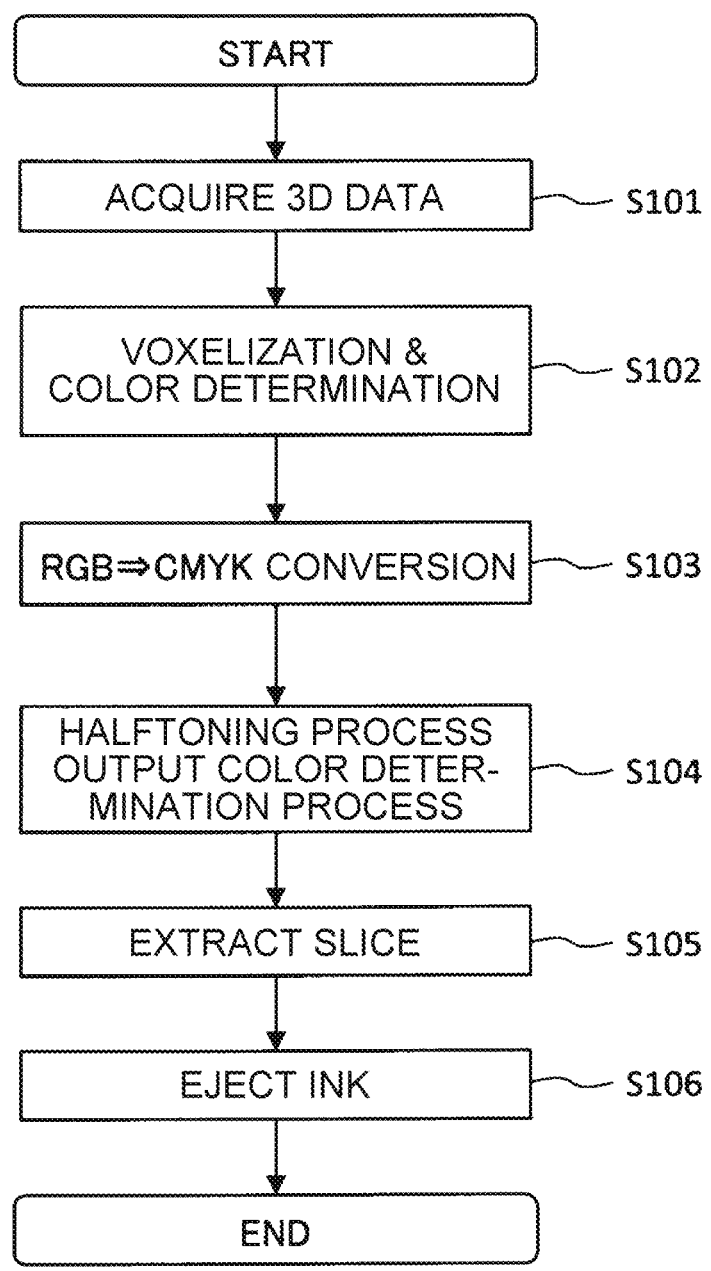
FIG. 2 is an overall process flowchart.

FIG. 2 is an overall process flowchart of the three-dimensional manufacturing system.

First, the CPU 101 of the data processing apparatus 16 acquires three-dimensional object data (3D data) (S101).

The 3D data may be acquired from a keyboard, an optical disc such as a CD-ROM, a USB memory, or the like via the input/output I/F 104, or may be acquired from another computer connected to the communication network 14 via the communication I/F 105. The 3D data is data representing the three-dimensional shape of the object and represents the outer shape of the object and the color of the surface thereof. The 3D data is configured with, for example, polygons and includes color data (for example, RGB data) of the surface of the object. Each polygon is an element when an object is represented with a combination of triangles or rectangles. The format of 3D data is not particularly limited but may be a data format created by CAD software or a data format created by software.

Next, in accordance with the processing program stored in the program memory 102, the CPU 101 of the data processing apparatus 10 converts the 3D data into voxel data and determines the color data thereof (S102). The voxel data here has depth data D from the surface of the object and color data (r, g, b).

The depth data D indicates a distance between a voxel center and the polygon closest to the voxel center. For example, the depth data D is calculated as an average value of distances from the voxel center to respective points on the closest polygon (if the polygon is a triangle, respective vertexes of the triangle).

Further, the color data is set for each voxel by determining whether to set the voxel as a color voxel or an achromatic color (white or transparent) voxel based on the depth data D. If the depth data D for a voxel is equal to or less than a predetermined threshold value, the CPU 101 sets the voxel as a color voxel, and if the depth data D for the voxel exceeds the predetermined threshold value, the CPU 101 sets the voxel as an achromatic voxel. That is, voxels up to a predetermined depth from the surface are set as color voxels, and voxels deeper than the predetermined depth are set as achromatic voxels. For the color data of a color voxel, the color data of the closest polygon is used as it is.

Next, in accordance with the processing program, the CPU 101 of the data processing apparatus 10 converts the color data (r, g, b) assigned to each voxel into CMYK data (S103). Conversion from RGB to CMYK is well known, and complementary color conversion, a lookup table (LUT), or the like may be used as in 2D printers. It is assumed that the clear head 129 of the three-dimensional manufacturing apparatus 12 ejects colorless transparent ink (manufacturing liquid). In this case, if the color represented by the color data (r, g, b) is white (all values of RGB are the maximum values), the color is converted into the achromatic color.

Next, in accordance with the processing program, the CPU 101 of the data processing apparatus 10 determines the output color of each voxel by a halftoning process and an output color determination process (S104). The halftoning process is well known, and error diffusion, a threshold dither matrix, or the like may be used as in 2D printers. For example, in the halftoning process using the threshold dither matrix, a three-dimensional threshold dither matrix corresponding to each color of CMYK is stored in the program memory 102 in advance, and the color data and the values of the threshold dither matrix are compared for each color. If the color data of a voxel is equal to or greater than the threshold value, the voxel is determined to be "ON." If the color data of the voxel is less than the threshold value, the voxel is determined to be "OFF." Then, the color data of the voxel is left only when the voxel is determined to be "ON."

Assuming that the halftoning process is sequentially executed for respective colors of cyan (C), magenta (M), yellow (Y), and black (K) by dither, error diffusion, or the like. Here, attention is paid to a certain voxel (a normal lattice unit in a three-dimensional space). In some cases, multiple colors may interfere with each other in the voxel by the halftoning process. For example, for such a voxel the determination result of cyan (C) is "ON," and the determination result of magenta (M) is also "ON."

Then, if multiple colors overlap and interfere with each other as described above, the CPU 101 selects one of the multiple colors using an input density and determines the color data of the voxel. This process will be described in more detail.

Through the halftoning process and the output color determination process, the color data of each voxel becomes data indicating one of cyan (C), magenta (M), yellow (Y), black (K), and achromatic color (white or transparent).

Next, in accordance with the processing program, the CPU 101 of the data processing apparatus 10 extracts data corresponding to one slice from the voxels whose color data has been determined (S105). The one slice corresponds to an amount by which the color head 128 and the clear head 129 of the three-dimensional manufacturing apparatus 12 are capable of ejecting during one movement. When extracting slice data from the voxels, the CPU 101 transmits the extracted slice data to the three-dimensional manufacturing apparatus 12 via the communication I/F 105 and the communication network 14.

The CPU 121 of the three-dimensional manufacturing apparatus 12 receives the slice data via the communication I/F 124, controls the motor driving unit 126 and the head driving unit 127 using the slice data, and ejects the ink (manufacturing liquid) from the color head 128 and the clear head 129 to manufacture the three-dimensional object (S106). The slice extraction and the ink ejection by the color head 128 and the clear head 129 are repeated, and slices are stacked in the height direction to manufacture the three-dimensional object.

Figure 3A:
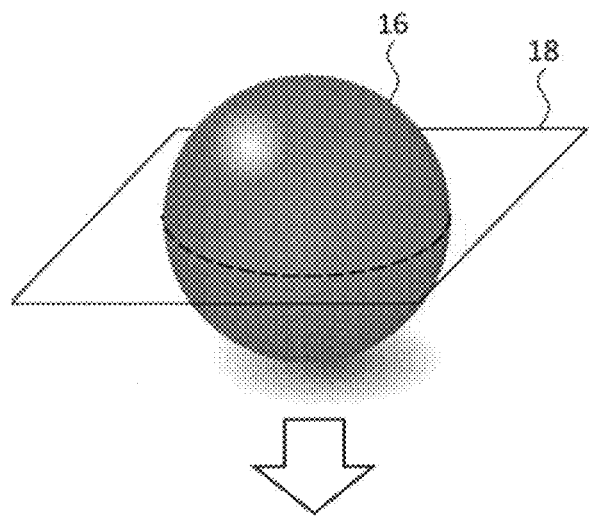
FIGS. 3A to 3C are explanatory diagrams of slice data.
Figure 3B:
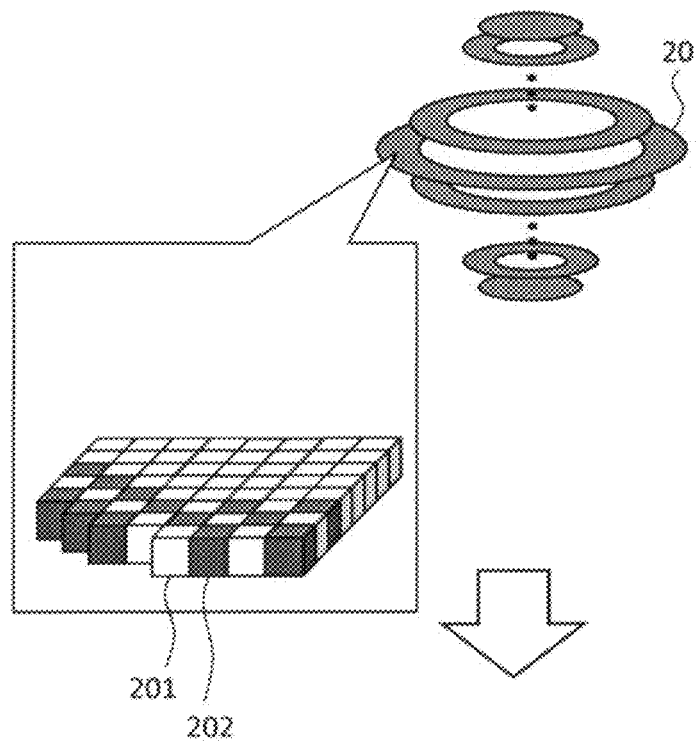
Figure 3C:
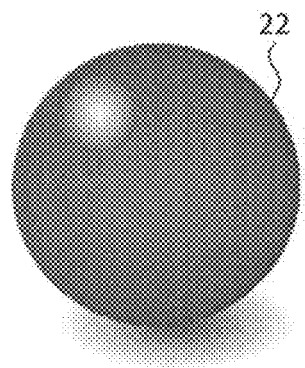

FIGS. 3A to 3C schematically illustrate the slice data. As illustrated in FIG. 3A, when the 3D data is converted into the voxel data and the color data of each voxel is determined, 3D data 16 configured with the voxels is sequentially sliced with a predetermined slice plane 18. Then, slice data 20 is extracted as illustrated in FIG. 3B. The slice data 20 is configured with multiple voxel data and includes data of achromatic voxels 201 and data of color voxels 202. Whether each voxel becomes the achromatic voxel 201 or the color voxel 202 is automatically determined from the color density of the polygon closest to the voxel and the depth data D of the voxel as described above.

Next, the halftoning process of each voxel in the CPU 101 will be described.

Figure 4A:
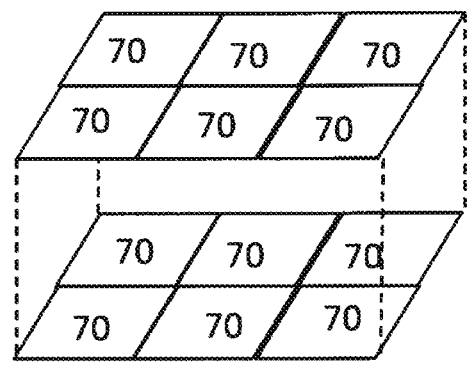
FIGS. 4A to 4C are explanatory diagrams of a halftoning process.
Figure 4B:
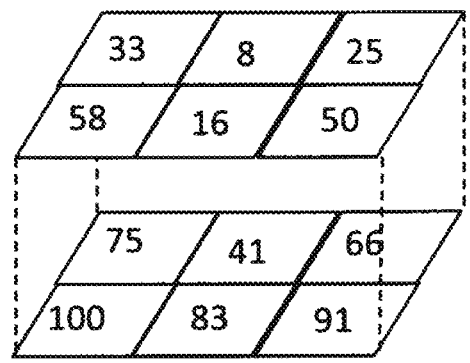
Figure 4C:
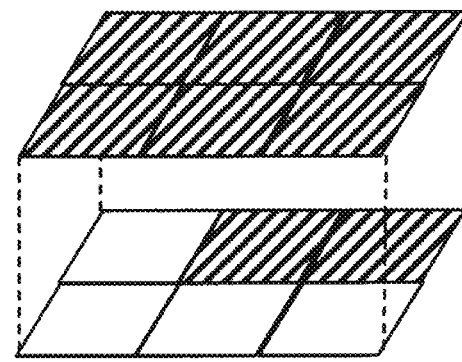

FIGS. 4A to 4C schematically illustrate the halftoning process using a dither matrix by way of example. FIG. 4A illustrates input density data of cyan (C). The number indicates the density of cyan (C) in each voxel. FIG. 4B illustrates a 3D dither matrix of cyan (C). A value shown in FIG. 4B indicates a threshold value for each voxel. In general, sizes of matrices for respective colors may be different from each other. Alternatively, arrangements of threshold values in the matrices for the respective colors may be different from each other. For each voxel, the input density and the threshold value are compared, and the following determination is made:

ON if the input density>the threshold value, or
OFF if the input density≤the threshold value.

The voxels determined to be ON are determined to be cyan (C), and the voxels determined to be OFF are determined to be an achromatic color. This process is executed for all voxels of each color.

If ON/OFF is determined by comparing the input densities and the threshold values for each color, the determination result for one voxel should be one of the following four types.

(1) Any color is determined to be OFF.
(2) Only one of the colors is determined to be ON.
(3) Two colors are determined to be ON.
(4) Three or more colors are determined to be ON.

Among the four types, in the case of (1), the color of the voxel in interest is determined to be an achromatic color. Also, in the case of (2), the color of the voxel in interest is determined to be a color voxel having the color that is determined to be ON. On the other hand, in the case of (3) and (4), since the multiple colors interfere with each other, it is necessary to determine the color of the voxel in interest to be any one of the colors by some method. This is because only one color of ink (manufacturing liquid) can be ejected to one voxel.

Figure 5:
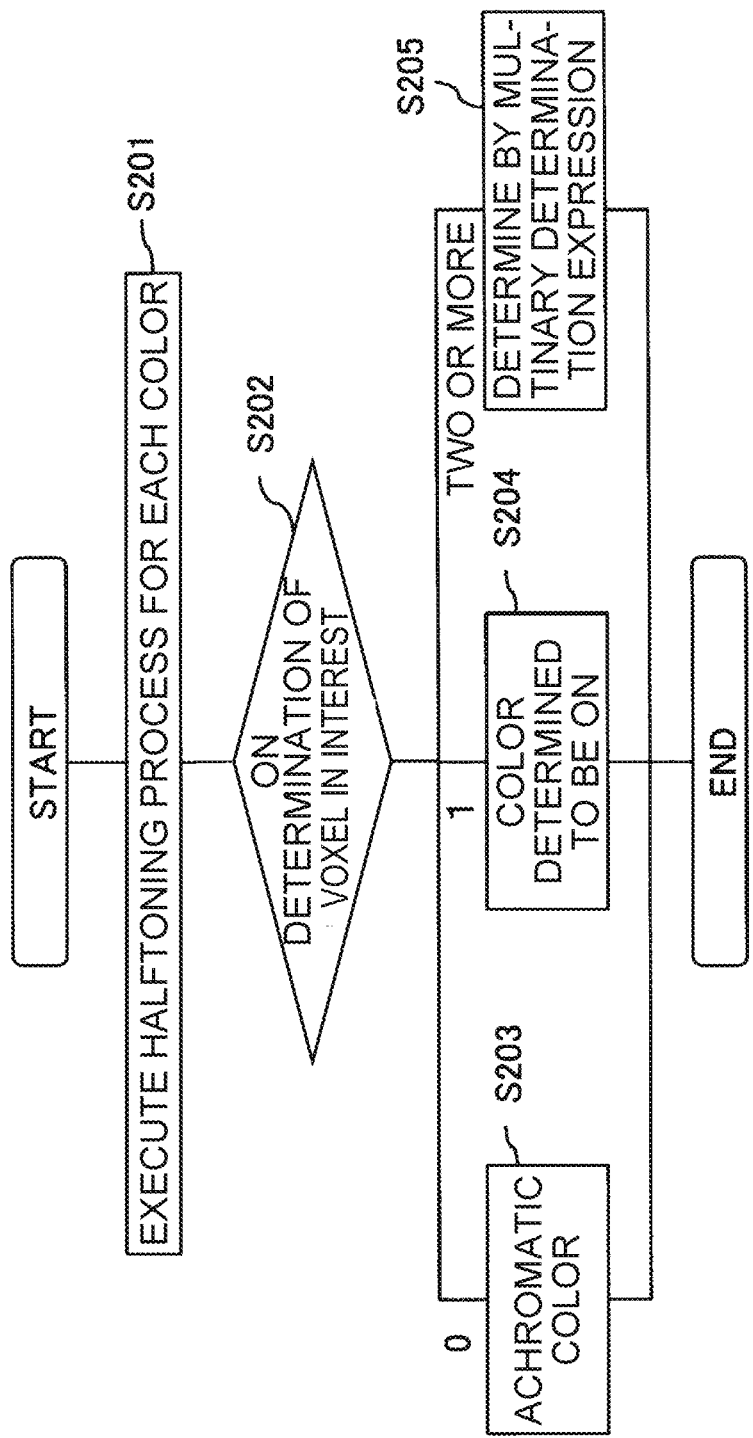
FIG. 5 is process flowchart of an exemplary embodiment.

FIG. 5 is a flowchart of the halftoning process in the CPU 101.

After converting the color data (r, g, b) assigned to each voxel into CMYK data (S103 in FIG. 2), the CPU 101 executes a halftoning process for each color using a dither matrix (S201). Through this process, the ON/OFF determination is made for each color of each voxel. The results of the ON/OFF determination are stored in the working memory 103. For example, it is assumed that voxels are referred to as voxel 1, voxel 2, voxel 3, . . .

Voxel 1: C (ON), M (OFF), Y (OFF), K (OFF)
Voxel 2: C (ON), M (ON), Y (OFF), K (OFF)
Voxel 3: C (OFF), M (OFF), Y (OFF), K (OFF)

.
.

and the like.

Next, the CFU 101 counts the number of ONs for a processing target voxel (voxel in interest) (S202).

If the number of ONs is zero, the voxel in interest is determined to be the achromatic color (S203).

If the number of ONs is one, the voxel in interest is determined to be the color determined to be ON (S204).

If the number of ONs is two or more, the color is determined by a predetermined multinary color determination expression (S205).

Hereinafter, the multinary color determination expression will be described.

<Multinary Color Determination Expression>

Descriptions will be made on a case where the halftoning process is performed for an input color that is a tertiary color including x % of a color X, y % of a color Y, and z % of a color Z, and as a result, all the three colors of XYZ are determined to be ON.

The CPU 101 searches for, as peripheral voxels of the processing target voxel, an achromatic voxel in which all colors are determined to be OFF, among voxels within a predetermined range (for example, 5 voxels in the vertical direction, 5 voxels in the horizontal direction, and 5 voxels in the depth direction, that is, 5*5*5−1=124 voxels. Here, −1 is to subtract the processing target voxel.

Then, the CPU 101 performs the following calculation for the achromatic voxel obtained by the search.

Determination expression J=a*(distance to processing target voxel)+b*|depth data of processing target voxel−depth data of achromatic voxel Here, a and b are coefficients and a>0 and b>0.

If multiple achromatic voxels are of obtained by the search, the determination expression J is calculated for all the obtained achromatic voxels. The CPU 101 determines (i) an achromatic voxel having the smallest value of the determination expression J as a first movement destination voxel and (ii) an achromatic voxel having the second smallest value as a second movement destination voxel. If only one achromatic voxel is obtained by the search, the achromatic voxel is determined to be the first movement destination voxel. If no achromatic voxel is obtained by the search, an alternative process is performed. An example of the alternative process is to change the processing target voxel from an ON-determined voxel to an OFF-determined voxel, that is, to an achromatic voxel.

The determination expression J has a smaller value as the distance between the processing target voxel and the achromatic voxel is decreased, and also has a smaller value as the difference in depth data between the processing target voxel and the achromatic voxel is decreased. In short, the determination expression J has a smaller value as the achromatic voxel is closer to the processing target voxel. If distances between achromatic voxels and the processing target voxel are equal to each other, the determination expression J for one achromatic voxel which is more identical in depth data to the target processing voxel has a smaller value. The coefficient a represents a weight of the distance, and the coefficient b functions as a weight of the depth data. As the coefficient a is larger, the more emphasis is put on the distance, which may affect the color non-uniformity. As the coefficient b is larger, the more emphasis is put on the depth, which may affect the color reproducibility.

The CPU 101 determines the first movement destination voxel and the second movement destination voxel using the value of the determination expression J. This determination is made in consideration of the case where all the three colors of XYZ are determined to be for the processing target voxel and the three colors interfere with each other. That is, the processing target voxel is determined to be one of the X, Y, and Z colors, and the remaining two colors are assigned to the first movement destination voxel and the second movement destination voxel, respectively.

Therefore, if where two colors X and Y in the processing target voxel are determined to be ON and the two colors X and Y interfere with each other, the CPU 101 may determine only the first movement destination voxel. That is, the processing target voxel is determined to be one of the X and Y colors, and the remaining one color is assigned as the first movement destination voxel.

Figure 6:
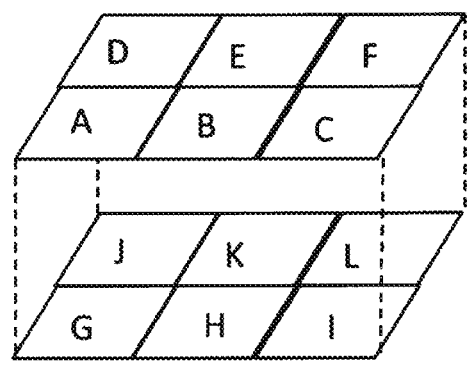
FIG. 6 is an explanatory view of a voxel group.

FIG. 6 illustrates an exemplary voxel group. Voxels A to L are present as illustrated in the figure.

Figure 7A:
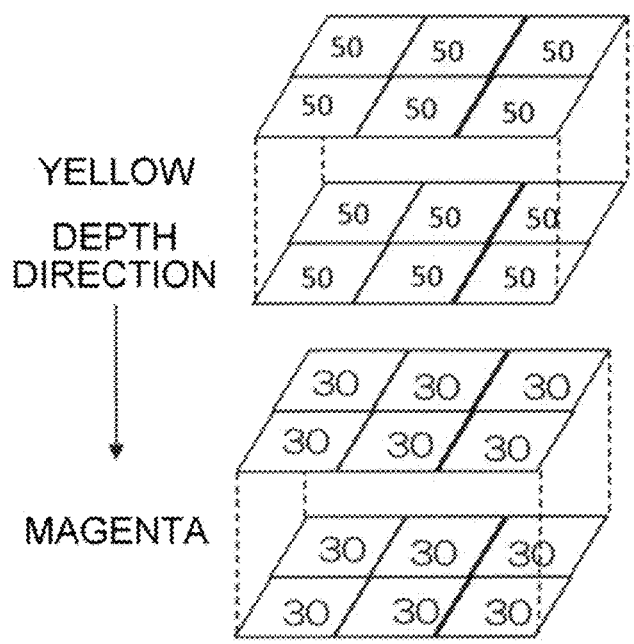
FIGS. 7A to 7C are explanatory views of a multinary determination expression.
Figure 7B:
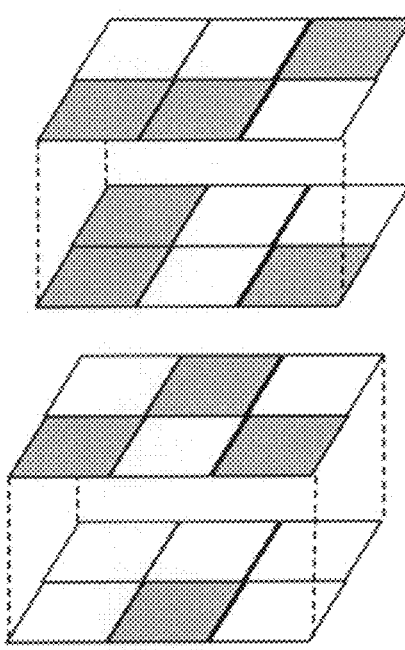
Figure 7C:
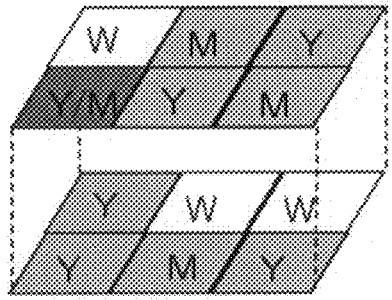

FIGS. 7A to 7C illustrate a specific process in the case where magenta (M) is 30%, yellow (Y) is 50%, a voxel size is 40 µm, and coefficients a=1 and b-1 in the determination expression J.

FIG. 7A specifically illustrates input densities. FIG. 7B illustrates a result of performing ON determination and OFF determination as a result of performing the halftoning process using a threshold value matrix for each of magenta (M) and yellow (Y). In the figures, voxels determined to be ON are drawn with hatching. FIG. 7C illustrates the halftoning result of magenta (M) and yellow (Y) in combination. For the voxels A to L illustrated in FIG. 6.

Voxel A: Y/M
Voxel B: Y
Voxel C: M
Voxel D: W
Voxel E: M
Voxel F: Y
Voxel G: Y
Voxel H: M
Voxel I: Y
Voxel J: Y
Voxel K: W
Voxel L: W Here, M represents magenta, Y represents yellow, and W represents an achromatic color. Y/M represents magenta and yellow. For the voxel A, the figure shows that two or more colors are determined to be ON as a result of the halftoning process.

Then, the CPU 101 searches for achromatic voxels within a predetermined range around the voxel A as a processing target voxel so as to determine the first movement destination voxel and the second movement destination voxel. In the predetermined range illustrated in FIG. 7, the voxel D, the voxel K, and the voxel L are achromatic voxels (W). Thus, values of determination expression J are calculated for the voxel A and the voxels D, K, and L.

Figure 8A:
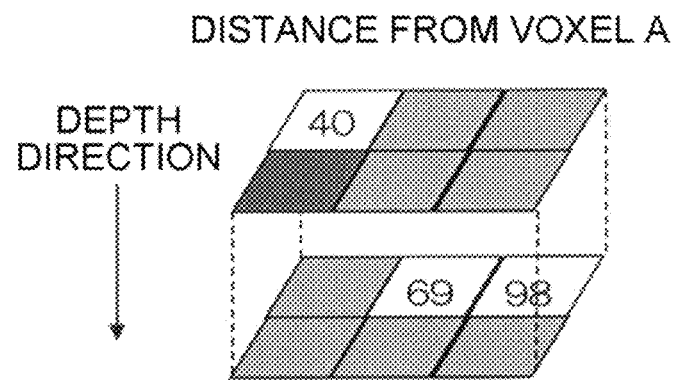
FIGS. 8A to 8C are explanatory views (Part 2) of the multinary determination expression.
Figure 8B:
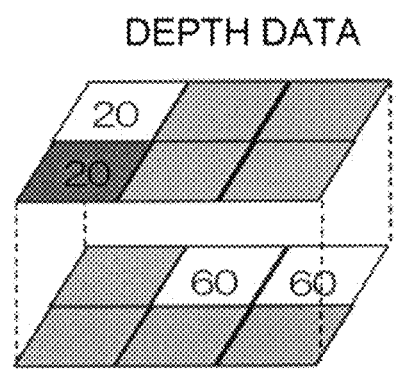
Figure 8C:
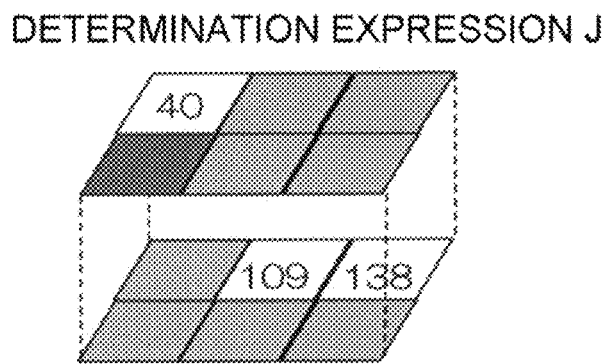

FIGS. 8A to 8C schematically illustrate a calculation process of the determination expression J. FIG. 8A illustrates the distances between the processing target voxel A and the achromatic voxels D, K, and L, respectively.

Distance between voxel A and voxel D=40
Distance between voxel A and voxel K=69
Distance between voxel A and voxel L=98

FIG. 8B illustrates the depth data of the processing target voxel A and the achromatic voxels D, K, and L.

Difference in depth data between voxel A and voxel D=20−20=0
Difference in depth data between voxel A and voxel K=60−20=40
Difference in depth data between voxel. A and voxel L=60−20=40

FIG. 8C illustrates a value of the determination expression J for each of the achromatic voxels D, K, L. The followings are obtained with the coefficients being a=b=1, voxel D: J=40+0=40
voxel K: J=69+40=109
voxel L: J=98+40=138

The CPU 101 needs to determine the first movement destination voxel because the two colors interfere with each other in the voxel A that is the processing target voxel. Therefore, the CPU 101 determines the voxel D having the smallest value of the determination expression J to be the first movement destination voxel with respect to the voxel A serving as the processing target voxel. When three colors interfere with each other in voxel A that is the processing target voxel, voxel K, which has the second smallest value of determination expression J, is determined to foe the second movement destination voxel, in addition to the first movement destination voxel.

After determining the first movement destination voxel (and the second movement destination voxel, as necessary) using the determination expression J, the CPU 101 determines the colors of the processing target voxel in which all the three colors of XYZ are determined to be ON, in the following manner.

<When Determining Output Color Based on Width of Lightness Region, of Coloring Materials>

If a relationship among the widths of the lightness regions is X>Y>Z, the output colors are determined, as follows:

Processing target voxel: color X
First movement destination voxel: color Y
Second movement destination voxel: color Z That is, for the processing target voxel, the color with the widest lightness region is preferentially determined, and the other colors are assigned to the first and second movement destination voxels in the order of the widths of the lightness regions.

If two colors of X and Y are determined to be ON for the processing target voxel, similarly, Processing target voxel: color X
First movement destination voxel: color Y <When Determining Output Color Based on Input Density of Coloring Material>

If the value of the input density is X>Y>Z, the output colors are determined as follows:

Processing target voxel: color Y
First movement destination voxel: color X.
Second movement destination voxel: color Z If two colors of X and Y are determined to be ON for the processing target voxel, similarly, the output colors are determined as follows:

Processing target voxel: color Y
First movement destination voxel: color X

Figure 9:
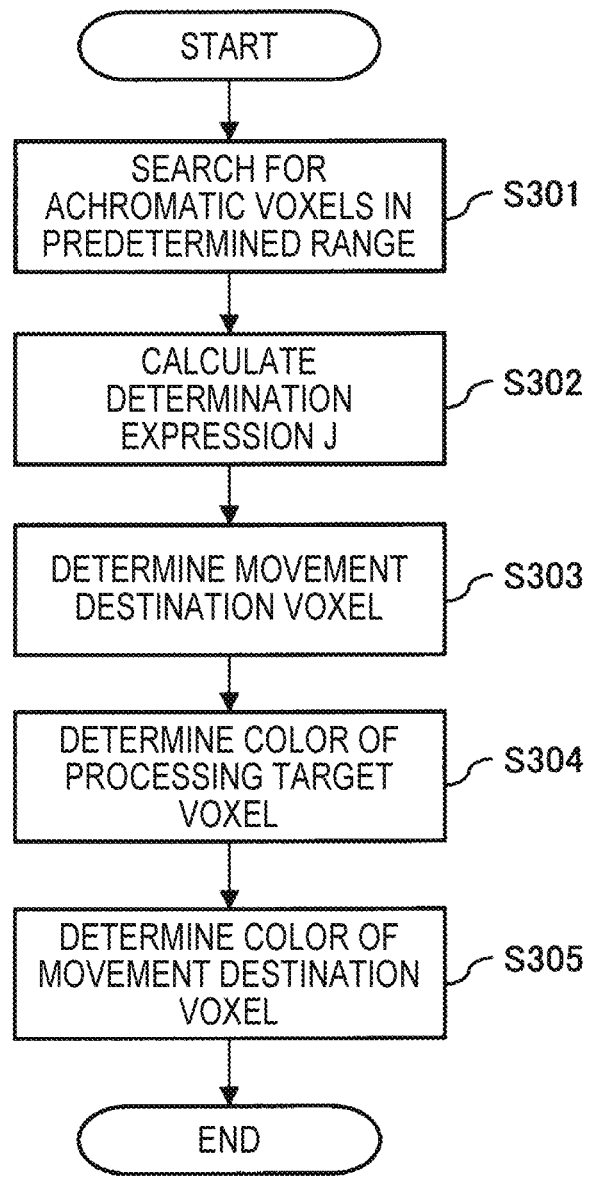
FIG. 9 is a process flowchart (Part 2) of an exemplary embodiment.

FIG. 9 collectively illustrates the flow of a process of the CPU 101 when two or more colors interfere with each other.

First, the CPU 101 searches for achromatic voxels within a predetermined range around the periphery of the process target voxel (S301). If there are any achromatic voxels, all the voxels are searched for. In addition, when there is no achromatic voxel, the determination for the processing target voxel is changed from ON to OFF, and the processing target voxel is set as an achromatic voxel.

Next, the values of the determination expression J are calculated for all the achromatic voxels present within the predetermined range (S302).

After the values of the determination expression J are calculated, movement destination voxels for the processing target voxel are determined using the values of the determination expression J (S303). If two colors interfere with each other in the processing target voxel, the first movement destination is determined. If three colors interfere with each other, the first movement destination voxel and the second movement destination voxel are determined. If four colors interfere with each other, the first movement destination voxel, the second movement destination voxel, and a third movement destination voxel are determined.

After the movement destination voxels are determined, the color of the processing target voxel is determined to be any of the colors based on a predetermined criterion (S304). The predetermined criterion is the lightness region of the coloring material or the input density of the coloring material.

After the color of the processing target voxel is determined, the colors of the movement destination voxels are determined based on the predetermined criteria using the remaining colors which interfere with each other in the processing target voxel (S305). This criterion is also the lightness region of the coloring material or the input density of the coloring material, and the criteria in S304 and S305 are the same.

As described above, in the exemplary embodiment, if two or more colors are determined to be ON and the two or more colors interfere with each other as a result of the halftoning process, the interference issue is solved appropriately by determining any one color for the voxel in interest and assigning the remaining colors to the achromatic voxels present around the voxel in interest. That is, if two or more colors interfere with each other, a desired color may not be obtained with the configuration in which one color is simply selected and output as a color of a processing target voxel. In the exemplary embodiment, an output color that is close to the desired color is obtained because non-selected colors are output using achromatic voxels around the processing target voxel.

Although the exemplary embodiment of the present invention has been described above, the present invention is not limited thereto. Various modifications may be made thereon. Hereinafter, the modifications will be described.

<Modification 1>

In the exemplary embodiment, for a voxel in which two or more colors interfere with each other as a result of the halftoning process, an achromatic voxel within a predetermined range of the voxel is searched for and determined to be a movement destination voxel. If there is no achromatic voxel, the processing target voxel is changed to an achromatic voxel. Alternatively, if no achromatic voxel is present within the predetermined range, it may be possible to search for any achromatic voxel again by expanding the predetermined range.

For example, it is assumed that the first search range is set to 3*3*3−1=26 voxels around the processing target voxel. If there is no achromatic voxel within the range, the range is expanded to 5*5*5−1=124 voxels, and the search is performed again. If there is still no achromatic voxel within the expanded range, the range is further expanded to 7*7*7−1=342 voxels, and the search is performed again. An upper limit is set to a predetermined range, and if no achromatic voxel is present even after reaching the upper limit, the processing target voxel may be changed to an achromatic voxel.

<Modification 2>

In the exemplary embodiment, if two colors interfere with each other In the processing target voxel, the first movement destination voxel is determined. If three colors interfere with each other, the first movement destination voxel and the second movement destination voxel are determined. Alternatively, if three colors interfere with each other, but the second movement destination voxel cannot be determined because only one achromatic voxel is present in the predetermined range, the remaining color of the three colors may not be assigned. Specifically, in the case where the width of the lightness region is used as a criterion, if the three colors of XYZ interfere with each other in the processing target voxel and if only the first movement destination voxel is present, the colors are assigned as follows:

Processing target voxel: color X
First movement destination voxel: color Y
The remaining color Z is not assigned.

Alternatively, if only one achromatic voxel is present in the predetermined range, an additional achromatic voxel may be searched for by sequentially expanding the predetermined range as in Modification 1. This means that the number of achromatic voxels to be searched for and the predetermined range may be changed depending on the number of colors that interfere with each other in the processing target voxel.

<Modification 3>

In the exemplary embodiment, the color of the processing target voxel and the color of the movement destination voxel are determined using the lightness region of the coloring material or the input density of the coloring material. Alternatively, the color of the processing target voxel and the color of the movement destination voxel may be determined using the lightness region and an input density of the coloring material in combination. For example, if the input densities are identical, the color of the processing target voxel and the color of the movement destination voxel are determined based on the width of the lightness region.

<Modification 4>

In the exemplary embodiment, the movement destination voxel is determined from the achromatic voxels using the value of the determination expression J. Alternatively, instead of using the determination expression J, the movement destination voxel may be determined randomly from the achromatic voxels within the predetermined range around the processing target voxel. Even in this case, the color of the processing target voxel is determined to be one of the colors, and the remaining colors are assigned to the movement destination voxels.

<Modification 5>

In the exemplary embodiment, voxels within the predetermined range in the vertical direction, the horizontal direction, and the depth direction are searched for as voxels within the predetermined range of the processing target voxel. Alternatively, for example, surrounding voxels with the identical depth data may be set as voxels within a predetermined range. For example, referring to FIG. 6, if the voxel A is the processing target voxel, achromatic voxels are searched for from the voxels B to D which are regarded as voxels within the predetermined range, and the voxels G to L are regarded as voxels out of the predetermined range and excluded from the achromatic voxels.

Alternatively, surrounding voxels, which are identical to the processing target voxel in positions in the vertical or horizontal directions and different from the processing target voxel only in depth data, may be used as the voxels in the predetermined range.

<Modification 6>

In the exemplary embodiment,

Determination expression J=a*(distance to processing target voxel)+b*|difference in depth data from processing target voxel| provided that a>0, b>0,

Alternatively, assuming that a=1, b=0, the following determination expression J may be employed.

Determination expression J=distance from processing target voxel

Further alternatively, assuming that a=0, b=1, the following determination expression J may be employed.

Determination expression J=|depth data of processing target voxel−depth data of achromatic voxel|

In short, the movement destination voxel may be determined using at least one of the distance between the processing target voxel and the surrounding achromatic voxel and the difference in the depth data therebetween.

<Modification 7>

In the exemplary embodiment, if two or more colors interfere with each other in the process target voxel, the color of the processing target voxel is determined, and the remaining colors are assigned to the movement destination voxels in accordance with a predetermined criterion. Alternatively, if two colors interfere with each other, the color of the processing target voxel, may be determined to be one of the colors and the remaining colors may be assigned to the movement destination voxels without using the predetermined criterion. That is, if three or more colors interfere with each other, the colors of the processing target voxel and the movement destination voxels may be determined using the predetermined criterion.

Figure 10:
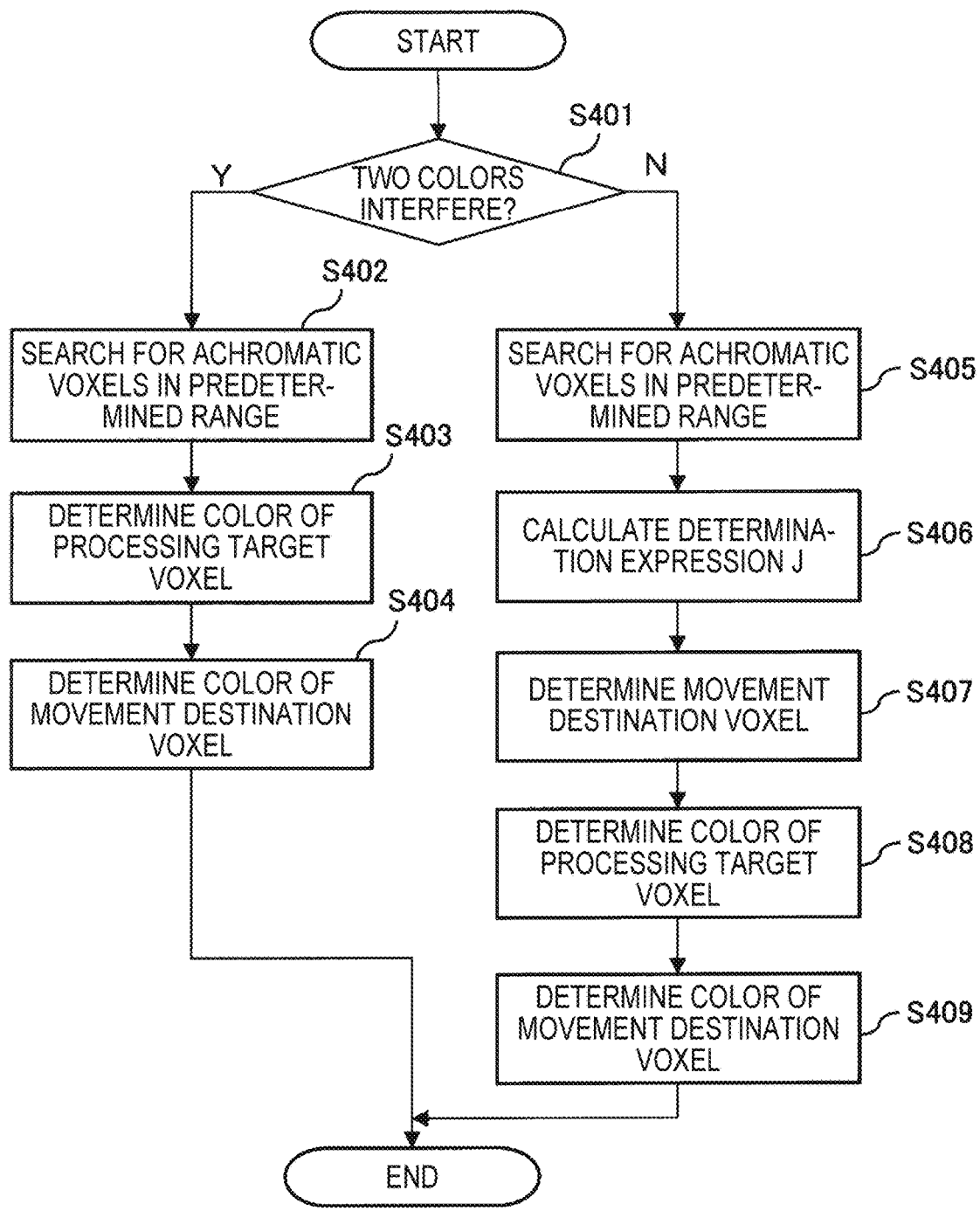
FIG. 10 is a process flowchart of a modification.

FIG. 10 illustrates a process flowchart of the CPU 101 in this modification.

First, the CPU 101 determines whether two colors interfere with each other in the process target voxel (S401).

If two colors interfere with each other (YES in S401), at least one achromatic voxel existing within a predetermined range from the processing target voxel is searched for (S402). Then, any one of the two colors is determined to be the color of the processing target voxel (S403), and the remaining color is assigned to the achromatic voxel obtained by the searching (S404). Of course, in the case of two colors, the color of the processing target voxel may be determined in accordance with a predetermined criterion (lightness region or input density).

If three or more colors interfere with each other (NO in S401), similarly to the process illustrated in FIG. 9, achromatic voxels in the predetermined range are searched for (S405), the value of the determination expression J is calculated to determine movement destination voxels (S406, S407), and the colors of the processing target voxels and the movement destination voxels are determined and output in accordance with a predetermined criterion (S408, S409).

<Modification 8>

In the exemplary embodiment, as illustrated in FIG. 2, when the 3D data is acquired (S101), the 3D data is converted into voxel data to determine whether to set the voxel as a color voxel (S102), and then RGB data is converted into CMYK data (S103). Alternatively, after the 3D data is acquired, the RGB data may be converted into the CMYK data, and then converted into voxel data to determine whether or not to be a color voxel.

In the exemplary embodiment, the color data of the 3D data input to the data processing apparatus 10 is RGB. Alternatively, the color data of the 3D data may be CMYK from the beginning <Modification 9>

In the exemplary embodiment, the distance between the processing target voxel and the closest polygon is calculated. In this case, however, a polygon present within the radius R in relation to the processing target voxel is searched for. If no polygon is present, the radius R may be sequentially increased, and the distance from the polygon present within the radius R may be calculated.

<Modification 10>

In the exemplary embodiment, the color data of the polygon closest to the processing target voxel is used so as to determine the color data of the processing target voxel. Alternatively, the color data of the processing target voxel may be corrected such that the color becomes lighter as the processing target voxel becomes deeper.

<Modification 11>

In the exemplary embodiment, the data processing apparatus 10 and the three-dimensional manufacturing apparatus 12 are separately provided and connected to each other so as to send and receive data through the communication network 14. Alternatively, the data processing apparatus 10 and the three-dimensional manufacturing apparatus 12 may be physically integrated to constitute a three-dimensional manufacturing system.

In addition, the data processing apparatus 10 and the network server may be connected by the communication network 14 such that the data processing apparatus 10 serving as a client transmits acquired 3D data to the network server, and the network server executes the processes from S101 to S105 of FIG. 2 and returns the slice data to the data processing apparatus 10 serving as the client or outputs the slice data to the three-dimensional manufacturing apparatus 12. In this case, the network server functions as the data processing apparatus 10.

<Modification 12>

In the exemplary embodiment, the steps from S101 to S105 in FIG. 2 are executed by the data processing apparatus 10, and the step of S106 is executed by the three-dimensional manufacturing apparatus 12. Alternatively, the steps up to S103 or S104 may be executed by the data processing apparatus 10, and the remaining steps may be executed by the three-dimensional manufacturing apparatus 12. In short, the data processing apparatus 10 may execute the processing of S102 and output the resultant voxel data (including color voxel data and achromatic voxel data) to the three-dimensional manufacturing apparatus 12. The output data of the data processing apparatus 10 may be temporarily stored in a recording medium or the like and supplied from the recording medium to the three-dimensional manufacturing apparatus 12.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A data processing apparatus comprising:
   a receiving unit that receives first data defining a shape and a color of a three-dimensional object; and
   a generating unit, wherein when two or more color components interfere with each other in one voxel as a result of performing a halftoning process for each of a plurality of color components based on color information in the first data, the generating unit generates color voxel data by assigning any one of the two or more color components as color information of the one voxel and assigning remaining color components of the two or more color components as color information of voxels present around the one voxel.

2. A data processing apparatus comprising:
   a receiving unit that receives first data defining a shape and a color of a three-dimensional object;
   a determining unit that determines for each of a plurality of color components whether or not to assign color information to each voxel based on color information in the first data; and
   a generating unit, wherein when the determining unit determines that two or more color components are assigned to one voxel, the generating unit generates color voxel data by assigning any one of the two or more color components as color information of the one voxel and assigning remaining color components of the two or more color components as color information of voxels present around the one voxel.

3. The data processing apparatus according to claim 2, wherein the generating unit assigns the remaining color components to an achromatic voxel that is a voxel, for which the determining unit determines that no color component is assigned, among the voxels present around the one voxel.

4. The data processing apparatus according to claim 3, wherein the generating unit assigns and outputs the remaining color components as color information of the achromatic voxel using at least one of (i) a distance between the one voxel and the achromatic voxel and (ii) a difference between depth data of the one voxel and depth data of the achromatic voxel.

5. The data processing apparatus according to claim 3, wherein the generating unit outputs the remaining colors as a color of the achromatic voxel using:
   determination expression J=a*(the distance between the one voxel and the achromatic voxel)+b*(the difference between the depth data of the one voxel and the depth data of the achromatic voxel) wherein a>0 and b>0.

6. The data processing apparatus according to claim 3, wherein the generating unit outputs a color of the one voxel and a color of the achromatic voxel using lightness regions of interfering colors.

7. The data processing apparatus according to claim 3, wherein the generating unit outputs a color of the one voxel and a color of the achromatic voxel using input densities of interfering colors.

8. The data processing apparatus according to claim 3, wherein the achromatic voxel is a voxel present within a predetermined range of the one voxel.

9. A three-dimensional manufacturing system comprising:
   the data processing apparatus according to claim 1; and
   a three-dimensional manufacturing apparatus that forms the three-dimensional object using data output from the data processing apparatus.

10. A three-dimensional manufacturing system comprising:
    the data processing apparatus according to claim 2; and
    a three-dimensional manufacturing apparatus that forms the three-dimensional object using data output from the data processing apparatus.

11. A non-transitory computer readable medium storing a program causing a computer to execute data processing comprising:
    receiving first data defining a shape and a color of a three-dimensional object; and
    when two or more color components interfere with each other in one voxel as a result of performing a halftoning process for each of a plurality of color components based on color information in the first data, generating color voxel data by assigning any one of the two or more color components as color information of the one voxel and assigning remaining color components of the two or more color components as color information of voxels present around the one voxel.

* * * * *